United States Patent
Ryu et al.

(10) Patent No.: US 7,157,271 B2
(45) Date of Patent: Jan. 2, 2007

(54) BIOFILTER EQUIPPED WITH A STIRRER AND INJECTOR OF SOLID FEED AND METHOD FOR REMOVING ODOR AND VOLATILE ORGANIC COMPOUNDS FROM WASTE GASES USING THE SAME

(75) Inventors: Hee Wook Ryu, Dokripmun Samho Apt. 107-1302, 100 Youngcheon-dong, Seodaemun-gu, Seoul (KR) 120-768; Kyung Suk Cho, Seoul (KR); Tae-Ho Lee, Anyang-si (KR)

(73) Assignees: Biosaint Co., Ltd., Seoul (KR); Hee Wook Ryu, Seoul (KR)

( * ) Notice: Subject to any disclaimer, the term of this patent is extended or adjusted under 35 U.S.C. 154(b) by 823 days.

(21) Appl. No.: 10/182,682

(22) PCT Filed: Dec. 4, 2001

(86) PCT No.: PCT/KR01/02092

§ 371 (c)(1),
(2), (4) Date: Jul. 31, 2002

(87) PCT Pub. No.: WO02/45826

PCT Pub. Date: Jun. 13, 2002

(65) Prior Publication Data

US 2003/0022360 A1   Jan. 30, 2003

(51) Int. Cl.
*C12M 3/00* (2006.01)
(52) U.S. Cl. .................................. 435/294.1; 435/299.1
(58) Field of Classification Search .............. 435/294.1
See application file for complete search history.

(56) References Cited

U.S. PATENT DOCUMENTS 6,245,554 B1 * 6/2001 Durham ...................... 435/266
6,335,191 B1 * 1/2002 Kiplinger et al. ........ 435/252.1

FOREIGN PATENT DOCUMENTS

DE            3801477    *  8/1989

* cited by examiner

*Primary Examiner*—David Redding
(74) *Attorney, Agent, or Firm*—Staas & Halsey LLP

(57) ABSTRACT

The present invention relates to an apparatus and a method removing contaminated gas by a biofilter resolving malodorous substance and volatile organic compounds, included in the waste gas generated from industrial and environmental facilities, into innoxious substances such as water, microorganism and carbon dioxide by means of microorganism The agitator of microorganism carrier of the present invention prevents the clog induced from the growth of microorganism, the increase of pressure loss thereby and the decrease of removing capacity of malodorous substance and volatile organic compounds by desorbing the biofilm.

4 Claims, 6 Drawing Sheets

BIOFILTER EQUIPPED WITH A STIRRER AND INJECTOR OF SOLID FEED AND METHOD FOR REMOVING ODOR AND VOLATILE ORGANIC COMPOUNDS FROM WASTE GASES USING THE SAME

TECHNICAL FIELD

The present invention relates to a biofilter apparatus comprising a stirring device preventing a block resulted from the bacterial growth; and an injecting device for solid nutrients, which can remove air pollution material such as malodors and volatile organic chemicals (hereinafter, referred to as "VOC") discharged from various industrial facilities to air by exploiting the bacterial decomposition and to a method for removing polluted gas with the biofilter apparatus.

BACKGROUND ART

Recently, in various industrial facilities and environmental foundations, malodors and waste gas polluted with volatile organic chemicals (VOC) are discharged to air a lot and cause air pollution. VOC is mainly composed of organic acid, aldehydes, ketones, aromatic compounds and the like and malodor inducers are commonly consisted in sulfide system substances such as hydrogen sulfide and methylmercapthane and nitrogen system substances such as ammonia and amines. Besides, waste gas has a wide spectrum in its state, depending upon the outlet source of waste gas such as an industrial factory.

Presently, various physical, chemical and biological methods have been tried to remove VOC and malodors included in air. For example, the cooling concentration method, the catalyst-type combustion method, the physical adsorption method, the cleaning method and the like have been utilized. Although the physical and chemical method among these removes polluted gas efficiently, it costs too much price to be operated for facilities, material, chemicals and the like. Furthermore, it is not economical to reduce the concentration of waste gas and to reach the outlet limit for the permission and also generates secondary contaminants such as $SO_x$, $CO$, $NO_x$. Therefore, the cleaning techniques have been developed continuously to be more favorable to environment, to have a higher efficiency and to reduce the price. Consequently, the biofiltration method in which VOC and malodors are converted to carbon dioxide and other material without or with less malodor is on the rise.

Compared with other methods for reducing malodors and VOC, the biofiltration technology is so outstanding that it requires less investment and cheap operation price, consumes less energy, produces chemicals with a low concentration and uses less fuel, as well as that it rarely generates secondary contaminants.

Unfortunately, there are a lot of problems in the conventional apparatus for removing odor and VOC by using biofilters. Concretely, (i) as the operation time using the biofilters increases, the empty space of carriers might be blocked by the microorganismic layer formed in accordance with the bacterial growth. Therefore, (ii) the removal rate is good in the initial stage, but air pores within carriers are clogged gradually as microorganisms proliferate much, which causes a biased flow of air, reduces the capacity of biofilters drastically and consumes electric power a lot since the pressure is lost highly. In addition, (iii) it is necessary to stir, wash and change carriers periodically in order to delete the microorganismic layer formed from the cell growth and (iv) the apparatus is large in the size and needs a wide space to be installed since it has a long retention period to treat polluted gas for about 30 seconds~ 3 minutes. Hence, the malodors and VOC are not managed efficiently and stably in practice. Especially, the problems which are provoked by use of the existed biofilters become still more serious, when the waste gas with the high content of organic compounds is treated.

Besides, there is another problem in the conventional apparatus for removing polluted gas by using the biofilters derived from the conventional technique. In detail, it has a disadvantage to provide nutrients for the bacterial growth. Since in the conventional process by using biofilters, the nutrients are added in a liquid state, it is necessary not to be freezed in winter season, to regulate temperatures for preventing the release of nutrients, to furnish a stirrer for preventing the precipitation, not to be contaminated by bacteria when it is left for a long time and the like.

Necessarily, new methods for eliminating polluted gas should be established to settle disadvantages demonstrated above, even in the prolonged operation.

DISCLOSURE OF INVENTION

Therefore, the inventors of the present invention have tried to develop a novel technique for removing malodors and VOC included in waste gas and to improve the problems of the conventional method described above so that the removal ratio became high during the long operation and the stability of operation was increased. In order to prevent the block caused by the bacterial growth and out of this, the reduction of the removal ratio, the principle that the bacterial layer formed onto the surface of carriers is eliminated by stirring carriers and spraying water was applied. Besides, Korean Patent Laid-open No. 2000-12740 also has disclosed that foamy polymer substances (polyurethane, polyethylene, polystyrene and so on) can fix microorganisms decomposing malodors and VOC a lot and maintain the humidity highly. The inventors of the present invention have designed new biofilter apparatus which is composed of a biofilter module filled with fixing carriers such as the foamy polymer and a stirrer mixing the fixing carriers and confirmed that the biofilter apparatus can prevent the biofilter block caused by the bacterial growth fundamentally, confer a operational stability and remove malodoring material and VOC efficiently so that the present invention has been completed successfully.

The first object of the present invention is to provide a biofilter apparatus comprising a stirring device which can remove malodors and volatile organic chemicals included in polluted gas efficiently and an injecting device for solid nutrients, which exploits a method for removing a biological membrane onto the surface of carriers resulted from a block phenomenon according to the bacterial growth by stirring carriers for fixing microorganisms and spraying in the apparatus for removing malodors and volatile organic chemicals.

The second object of the present invention is to provide a method for removing malodors and VOC by using the biofilter apparatus.

The third object of the present invention is to provide a process for preparing essential nutrients for the bacterial growth in a solid form.

The fourth object of the present invention is to provide an injecting device for solid nutrients prepared by the above process.

In order to accomplish the first object, the present invention provides an apparatus for removing malodors and volatile organic chemicals (VOC) (hereinafter, referred to as "biofilter apparatus"), which comprises a housing in which an inject port of polluted gas and an exhaust port of treated gas are installed; a support lathe for carriers fixing microorganisms which is situated on the inner lower surface of the housing; a biofilter layer (or a carrier layer) which is filled with microorganismic carriers and loaded onto the support lathe; a spray tube which is installed on the empty space formed in between the upper surface of the carrier layer and the inner upper surface of the housing and sprinkles water and nutrients onto the upside of the carrier layer; a biofilter module including a stirring apparatus for carriers which comprises a stirring axis and a stirring device and solving the increase of pressure loss and the block phenomenon in accordance with the bacterial growth; a storage tank for providing water and nutrients to the spray tube; and a stirring motor for operating the stirring apparatus; and which discharges air injected from the inject port of polluted gas to the exhaust port of treated gas only through the biofilter layer and is installed with the stirring apparatus shaking the carriers of the biofilter layer or with the stirring apparatus and the injecting device for solid nutrients.

In order to accomplish the second object, the present invention provides a process for removing malodors and volatile organic chemicals, which comprises the steps of (i) inoculating microorganisms decomposing malodors and volatile organic chemicals into the carrier layer and the storage tank, cultivating, fixing the decomposing microorganism onto the carrier and proliferating; (ii) injecting the polluted gas collected from the outlet source of polluted gas to the inject port of polluted gas, passing the carrier layer through the biofilter layer and then decomposing contaminants by use of microorganisms fixed onto the carrier; (iii) spraying the culture solution of the storage tank onto the carrier layer intermittently in order to provide nutrients and water to microorganisms fixed onto the carrier; (iv) exchanging the culture solution with fresh culture medium periodically; and (v) operating a stirring device of carriers when microorganisms proliferate and block the carrier layer for removing malodors and volatile organic chemical (when the pressure loss increases and the removal ratio of malodors and VOC reduces), shaking the carrier, eliminating the biological membrane formed onto the surface of carriers, sprinkling the culture medium of the storage tank and washing the separated biological membrane.

In order to accomplish the third object, the present invention provides several processes for preparing solid nutrients.

One of the process for preparing the solid nutrient comprises steps of (i) blending essential nutrients (such as N, P, S, Mg and so on) for the bacterial growth in a proper ratio and collecting a mixed nutrient; (ii) adding water to starch, rice powder and the like in a proper amount, stirring and obtaining a slurry; (iii) adding the mixed nutrient collected above into the slurry, stirring and preparing a mixture; and (iv) putting the mixture into a mold with various shapes such as a round or a square and drying.

Another process for preparing the solid nutrient comprises steps of (i) blending essential nutrients (such as N, P, S, Mg and so on) for the bacterial growth in a proper ratio and collecting a mixed nutrient; (ii) adding water in a small amount to sugars (glucose, sucrose and so on) or the nutrient which has the lowest melting point among all the nutrients added, rice powder and the like, heating and collecting a melted solution; (iii) adding the mixed nutrient collected above into the melted solution, stirring and preparing a slurry solution; and (iv) putting the slurry solution into a mold with various shapes such as a round or a square and solidifying the slurry solution.

At that time, the essential nutrients for the bacterial growth are composed of preferably $FeSO_4$, $K_2HPO_4$, $MgSO_4$, $NaH_2PO_4$ and $(NH_4)_2SO_4$ in the ratios of 1~4%, 2~5%, 5~10%, 7~11% and 70~85% per total weights respectively in order.

The solid nutrient prepared by the process of the present invention has various shapes and various states in ingredients.

In order to accomplish the fourth object, the present invention provides an injecting device for solid nutrients, which comprises a storage tank for solid nutrients which can inject solid nutrients into the apparatus, a gear motor, an operating apparatus including a fixing bar screw and the like, a plate cover of a throw port and the like.

The above and other objects, features and other advantages of the present invention will be more clearly understood from the following detailed description taken in conjunction with the accompanying drawings, in which.

Preferred embodiments of the present invention will now be described with reference to the accompanying drawings.

FIG. 1 depicts a partial fraction of the biofilter apparatus installed with the stirring device in the present invention. FIG. 2 depicts a lateral view of the stirring device of the carriers in the present invention. FIG. 3 depicts a cross sectional view of the injecting device for solid nutrients in the present invention. FIG. 4 depicts an outline view of the biofilter apparatus in an embodiment of the present invention.

The biofilter apparatus of the present invention removing malodors and VOC in which the stirrer is installed comprises an inject port 2 of polluted gas, an exhaust port 3 of treated gas, support lathe 4 of carriers, a manhole 11, a flange 5 connecting biofilter modules 1, a biofilter carrier layer 6; a carrier stirrer 7; a biofilter module 1 composed of a spray tube 8 for providing nutrients and water; a stirring motor 9 of a stirrer; a storage tank 10 of nutrients and medium; and a screen 12.

The biofilter module 1 and the storage tank 10 of the present invention can be utilized in various shapes such as a square, a cylinder or the like and can be prepared with various plastic material which is resistant to acids and includes FRP, PVC, polyethylene; stainless steel material; and metal material covered with epoxy, carbon or the like. The biofilter module 1 can be adjusted in the size (length and width or diameter and height) freely, depending upon the capacity for treating polluted gas. The biofilter apparatus can be controlled to change stage numbers on the biofilter module 1 in accordance with the capacity for treating polluted gas containing malodors and VOC and the stage number of the biofilter module can be installed in between 2~10. The polluted gas is injected through each biofilter module 1.

The support lathe 4 within the biofilter module 1 of the present invention plays a role to support the fixing carrier. Depending upon occasions, polluted gas can be transferred to the carrier layer through the lower portion of the support lathe or through the upper portion of the carrier layer. The support lathe 4 also has a function to outlet the nutritive medium sprayed onto the upper portion of the carrier layer. The biofilter carrier layer 6 on the support lathe 4 is filled with the fixing carrier in the constant height which is lower than the height of the exhaust port. The carrier can be a fixing carrier which is composed of polymer substances and has a net structure such as polystylene, polyethylene and so on, or which is composed of foamy polymer substances such as polypropylene, polyurethane, polyethylene and so on and has a size in between 1~10 cm. The porosity can be in the range of 90~95% and the size of pores can be in the range of 0.5~5 mm. This fixing carrier has a feature that the humidity is high and the fixing capacity of microorganisms is remarkable. Especially, since the fixing carrier has a small weight, the carriers filled in the biofilter carrier layer 6 can be shaken easily through the stirring device.

In addition, the present invention provides a method for removing malodors and VOC from polluted gas, which exploits the biofilter installed with the stirring device or the biofilter installed with the stirring device and the injecting device for solid nutrients. Concretely, this process comprises steps as follows: inoculating microorganisms decomposing malodors and volatile organic chemical into the biofilter module 1 and the storage tank 10, spraying water onto the biofilter carrier layer and fixing the decomposing microorganisms onto the carrier; injecting the polluted gas collected from the outlet source of polluted gas to the inject port of the biofilter apparatus, passing through the biofilter carrier layer and then decomposing contaminants by use of microorganisms fixed onto the carrier. Consequently, the polluted material can be changed to harmless materials and without malodor such as water, microorganism, carbon dioxide and the like and be eliminated.

The mechanism for decomposing malodors and VOC by use of the fixed microorganism in the biofilter apparatus will be described below.

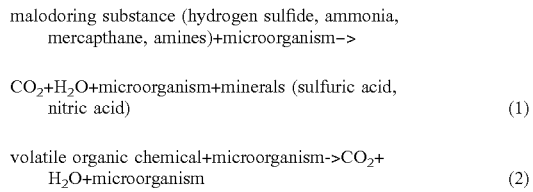

In order to provide water and nutrients to microorganisms of the biofilter module, the culture medium of the storage tank is sprayed intermittently onto the carriers filled onto each module and is exchanged with new nutritive medium periodically. The screen 12 of the storage tank 10 plays a role to remove alien substances and to prevent the inlet to the circulating pump 32. When the operation period is prolonged, the carrier layer is apt to be blocked by the bacterial growth and the pressure loss tends to increase to 30~50 mm $H_2O$ in the biofilter layer removing malodors and VOC substance. At this moment, the stirring device of carriers is operated and the biological membrane formed in between carriers is eliminated. Then, the spraying apparatus is put on and the biological membrane separated from the surface of carriers is flown into the storage tank 10 and treated. As a result, the process and the apparatus of the present invention can prevent the increase of the pressure loss due to the bacterial growth and the reduction of the removal ratio for malodors and VOC as well as can maintain the cell weight within the fixing carriers consistently even in the prolonged operation so as to sustain the efficiency for removing malodors and VOC.

As depicted in FIG. 4, the biofilter apparatus described above comprises a blower 28 collecting the polluted gas containing malodors and VOC, an air heater (not depicted), a nutrient provider 27 for providing inorganic nutrient salts essential for the bacterial growth, an acid storage tank 29 and an alkali storage tank 30 for controlling pHs of culture medium, a chemical pump 31 for providing acids and alkalis, a circulating pump 32 for transferring the culture broth of microorganism to the biofilter carrier layer 6, a controlling system 33 and the like can be added. At this moment, the circulating pump 32 of the present invention is preferably resistant to acids.

The biofilter apparatus of the present invention has a peculiar function to shake the carrier for fixing microorganisms which is filled onto the biofilter layer. The stirring device for carriers which is applied for the biofilter reaction tank in a cylinder shape comprises a stirring motor 9, a stirring axis and a stirrer 7. The stirrer 7 is installed with an upper portion supporter 13, a lower portion supporter 15 and a stirring bar 14 perpendicular to these supporters and centered to the stirring axis in a right and left symmetry or in non-symmetry. The stirrer rotates by using the stirring motor 9 so as to shake carriers functionally. In order to increase the stirring capacity, the stirring bar 14 is installed in a non-symmetry to the right and the left direction at which the stirring axis is a center preferably. The lower portion supporter 15 is made to have a slope of about 15~30 degrees so that it plays a role to support the stirring bar 14 as well as to make the fixing carrier at the lower portion (upright to the support lathe) of the biofilter layer raised a little upward and mixed by rotating the stirrer. Depending upon occasions, the lower portion supporter 15 cannot be utilized. The stirring device of the present invention is a practical and preferred embodiment and does not limit the scope of the present invention. Precisely, it can adopt various modes of stirring and the like, depending upon the shape and the size of the biofilter apparatus and commonly have a feature that the carriers be stirred.

The injecting device for solid nutrients of the present invention comprises a outer case 15, a tightening device 16, a gear motor 17, a fixing bar screw 18, a recoil screw 19, a storage tank of solid nutrients 20, a cover of storage tank 21, solid nutrients 22, a nutrient supporter 23, a plate cover of an inject port 24, a plate cover support spring 25 and the like. The injecting device for solid nutrients is operated in accordance with the principle that the turning effect is generated from the gear motor 17, the fixing bar screw 18 as an external thread connected with the tightening device 16 rotates at the very place, the recoil screw 19 as an internal thread progresses, at this moment the recoil screw 19 pushes out one nutritive agent in the lower portion of the nutrient supporter 23 and the plate cover support spring 25 is extended by the weight of the nutritive agent falling to the plate cover of the inject port 24 so that the plate cover of the inject port 24 is opened, the nutrient can be injected to the biofilter apparatus and the recoil screw 19 which is pushed out moves some distance and retrogresses again with the gear motor 17 rotating in the reverse direction so as to be recovered to the original state. Besides, the falling portion is prepared to have a slope structure with some inclination in order to provide the solid nutrients safely, which is designed to slide the solid nutrients toward the biofilter apparatus. The operational portion of the present invention including the gear motor 17 can be substituted with various devices such as a piston style operation device and the like due to functions. The injecting device for solid nutrients can be controlled by using various kinds of controllers and adjust the operation time with an interval, the numbers of the operation and the like so that the injection amount of nutrients can be regulated automatically or manually.

If the biofilter apparatus described in the present invention is adopted, malodors and VOC included in polluted gas can be removed easily. Concretely, the present invention provides a method for removing malodors and VOC of polluted gas which exploits the biofilter apparatus installed with the stirring device or the biofilter apparatus installed with the stirring device and the injecting device for solid nutrients. This process comprises steps of inoculating microorganisms decomposing malodors and volatile organic chemical into the biofilter layer 6 and the storage tank of culture medium 10, cultivating, fixing the decomposing microorganisms onto the carrier and proliferating microorganisms; injecting the polluted gas collected from the outlet source of polluted gas to the inject port of the biofilter apparatus, passing through the biofilter carrier layer and then decomposing contaminants by use of microorganisms fixed onto the carrier; spraying the culture solution of the storage tank onto the carrier layer 6 filled in the each module intermittently for providing nutrients and water to microorganism fixed onto the biofilter module; disposing the culture solution in some amount periodically and replenishing fresh nutritive medium and water; and operating the stirring device 7, 9 of carriers when microorganisms proliferate and block the biofilter carrier layer for removing malodors and VOC (when the pressure loss increases and the removal ratio for malodors and VOC reduces), eliminating the biological membrane formed in between fixing carriers, spraying the culture medium of the storage tank and washing the separated membrane.

In order to fix microorganisms onto the carriers, the bacteria for the seed culture is inoculated to the storage tank of culture medium 10 and the culture broth is sprayed to attach the bacteria onto the fixing carrier 6. In the biofilter apparatus and the process for removing malodors and VOC from polluted gas by using the apparatus, various kinds of microorganisms such as *Thiobacillus* sp., *Pseudomonas* sp., *Bacillus* sp. and the like and a mixture of more than one strains can be utilized, depending on the kinds and states of malodors and VOC substances.

If the process is completed to fix microorganisms, the polluted gas collected from the exhaust source of polluted gas goes through the carrier layer 6 for fixing microorganisms and is degraded to water, carbon dioxide, microorganism, minerals and the like by the microorganismic decomposition. The treated gas passing through the biofilter module 1 is discharged to air. At this moment, in order to inject the polluted gas collected from the biofilter apparatus, both the operation in the downward direction that the biofilter carrier layer 6 flows from upside to downside and the operation in the upward direction that the support lathe 4 passes through the biofilter layer can be performed.

In order to sustain the decomposition activity onto the biofilter carrier layer 6 highly, polluted gas is injected in a proper temperature range of 15~35° C. preferably and even in winter season, the temperature of the polluted gas is preferably controlled in a proper range with the air heater (not depicted). Besides, in order to sustain the decomposition efficacy for the polluted gas, the humidity of carriers is preferable to be controlled consistently in the range of 95~100%. For this purpose, the circulating pump 32 is operated and the circulating water is sprayed onto the biofilter carrier layer 6 three to four times per day by using the spray tube 8 installed in the upper portion of the biofilter carrier layer 6. At this moment, preferably the circulating water is provided with inorganic mineral salt medium including K, P, N, S, Mg and Fe or with the solid nutrients of the present invention intermittently in order to sustain the bacterial growth and the decomposition activity. In addition, the supplementary water can be utilized to replenish the loss of the circulating water due to the evaporation and some of the circulating water is discharged periodically so as to maintain the bacterial activity highly.

In the method for removing malodors and VOC substances by using microorganisms and the purification apparatus for the polluted gas, when the retention period of the polluted gas which is injected to the biofilter module 1 is in the range of 3~10 seconds, the removal ratio is identified to be high for malodoring substances such as toluene, benzene, xylene and the like and to be sustained stably even in the long operation of about 100~150 days.

Furthermore, since the biofilter of the present invention is installed with the stirring device for carriers, the operation can be performed for a long time and stably without difficulties. Concretely, the fixing carriers is prevented from the block caused by the bacterial growth during the removal and the stirring device can prevent the biased flow, the increase of the pressure loss and the reduction of the efficacy for decomposing contaminants and can prolong the life of carriers, which facilitates the maintenance.

In practice, the biofilter reactor of the present invention has a short retention time at the range of 3~10 seconds even in the prolonged operation, can maintain the pressure loss in the range of less than 30~50 mm $H_2O$ and always sustain the removal capacity highly in the range of 90~99%.

EXPLANATION OF SYMBOLS IN THE FIGURES

Figure 1:
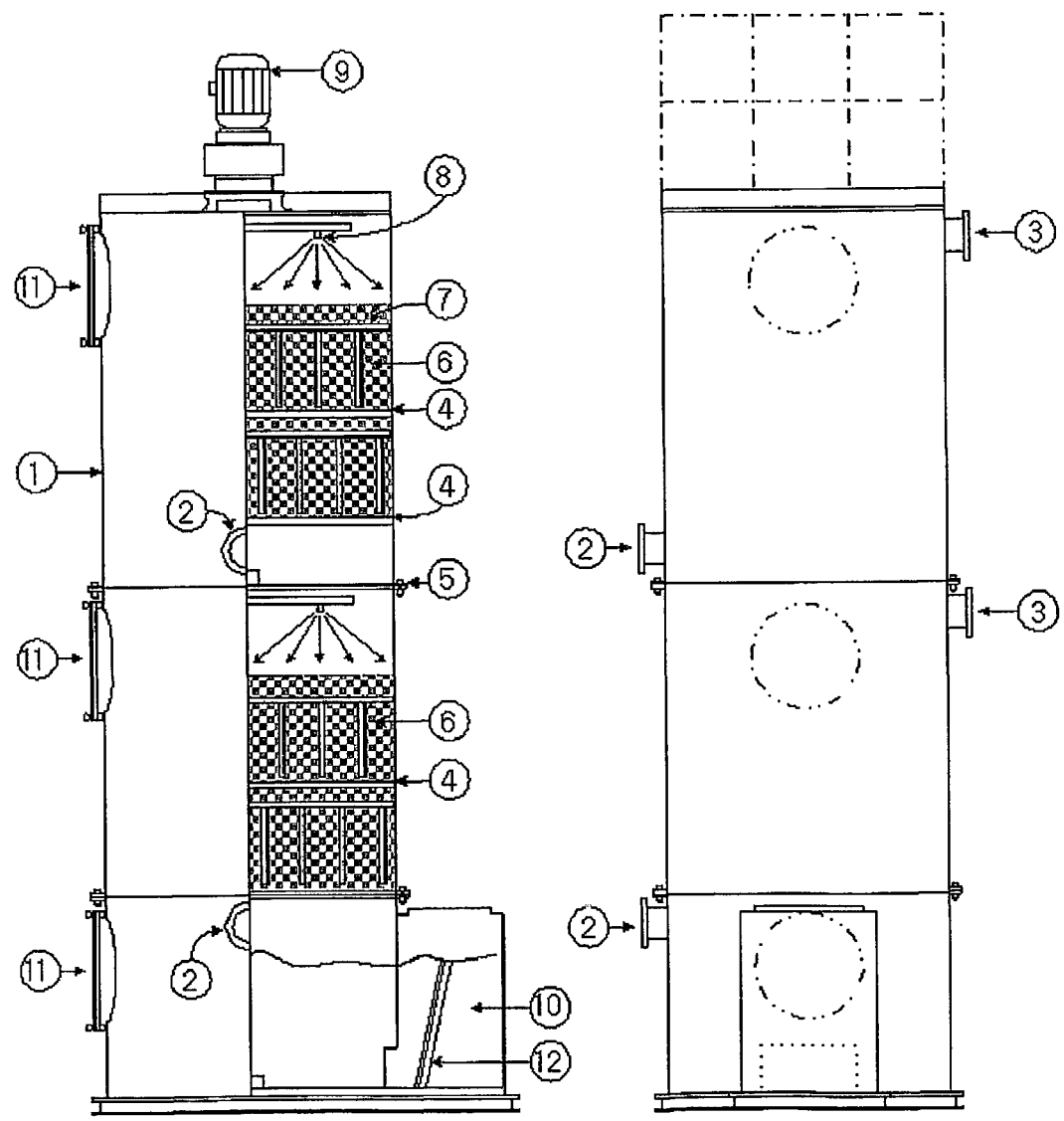
FIG. 1 depicts a partial fraction of the biofilter apparatus in the present invention.

1: biofilter module
2: inject port of polluted gas
3: exhaust port of treated gas
4: support lathe of carriers
5: flange
7: stirrer
8: spray tube
9: motor of stirrer
10: storage tank of culture medium
11: manhole
12: screen
13: upper portion supporter
14: stirring bar
15: lower portion supporter
16: tightening device
17: gear motor 18: fixing bar screw
19: recoil screw
20: storage tank of solid nutrients
21: cover of storage tank
22: solid nutrients
23: nutrient supporter
24: plate cover of inject port
25: plate cover support spring
27: injecting device of solid nutrients
28: blower
29: acid storage tank
30: alkali storage tank
32: circulating pump
33: controlling system

BEST MODE FOR CARRYING OUT THE INVENTION

Practical and presently preferred embodiments of the present invention are illustrative as shown in the following Preferred Embodiments.

However, it will be appreciated that those skilled in the art, on consideration of this disclosure, may make modifications and improvements within the scope of the present invention.

PREFERRED EMBODIMENT 1

The Preparation of Solid Nutrients

In order to prepare the nutritive agent in a solid form, nutritive elements such as N, P, S, Mg and so on essential for the bacterial growth was utilized and precisely, $K_2HPO_4$—50 g, $NaH_2PO_4$—120 g, $(NH_4)_2SO_4$—1000 g, $MgSO_4$—100 g, and $FeSO_4$—30 g were blended to prepare the mixed nutrient. Then, 400 g of water was added to 500 g of starch and stirred so as to obtain a resultant in a slurry state. The mixed nutrient prepared above was added to the slurry, mixed for 3 minutes and put into a mold manufactured in a round style (diameter 10 cm, height 1.5 cm) with the amount of 120 g respectively. Then, the water was dried by evaporating in the oven at 80° C. and as a result, the solid nutrients of the present invention were obtained.

PREFERRED EMBODIMENT 2

The Deodorization by Using the Biofilter Apparatus with the Stirring Device

Figure 2:
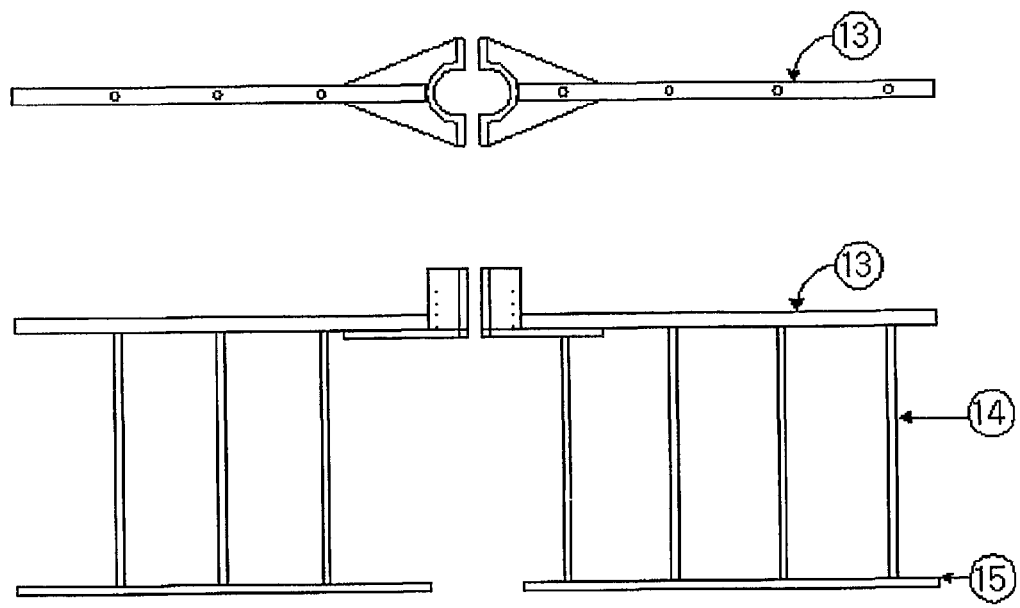
FIG. 2 depicts a lateral view of the stirring device of the fixing carrier in the present invention.
Figure 3:
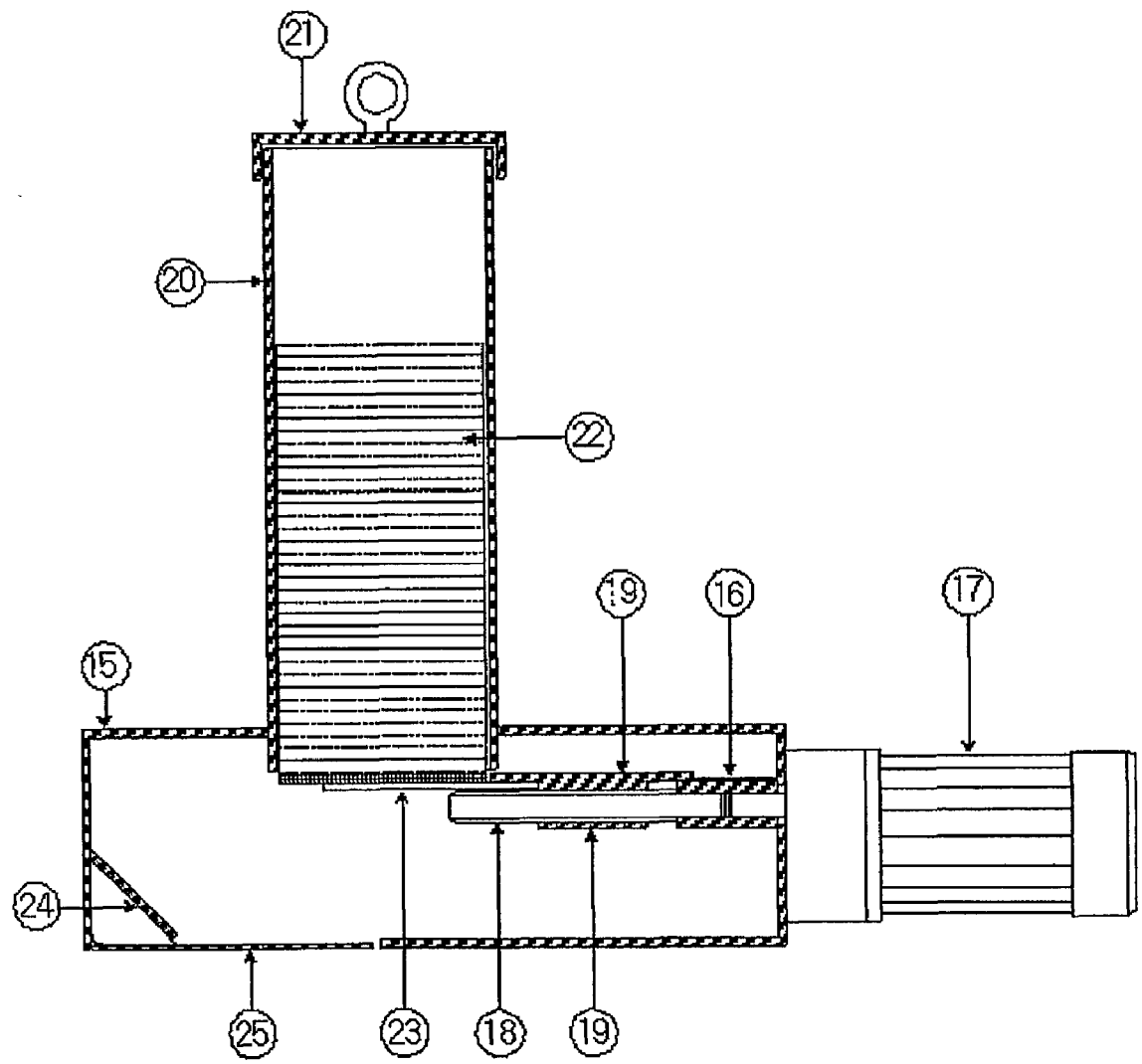
FIG. 3 depicts a cross sectional view of the injecting device of solid nutrients in the present invention.
Figure 4:
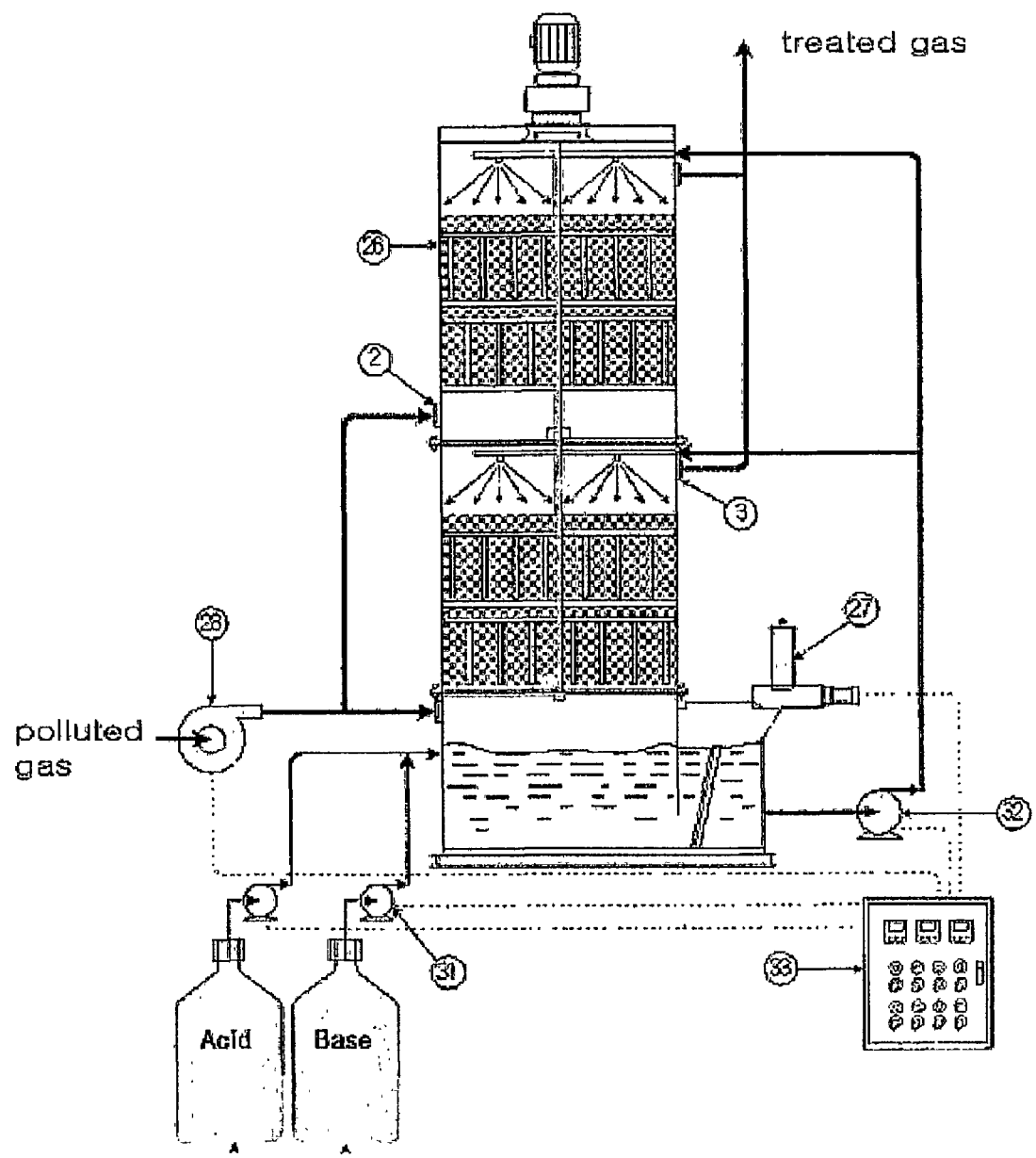
FIG. 4 depicts an outline of the biofilter apparatus installed with the stirring device and the injecting device for solid nutrients in the present invention.
Figure 5:
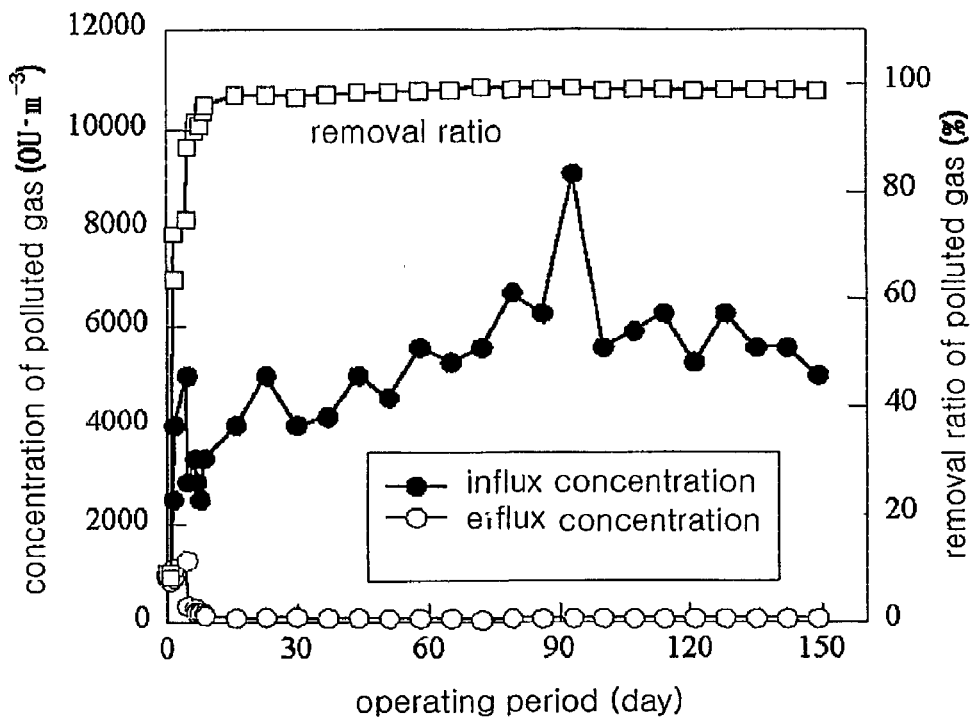
FIG. 5 depicts the capacity for removing malodors by using the biofilter apparatus installed with the stirring device and the injecting device for solid nutrients in the present invention.

The carriers (2 cm×2 cm, pore size 1~3 mm, porosity 90%) were composed of foamy polyurethane as illustrated in FIG. 1. The biofilter apparatus comprised 2 biofilter modules (height 1.7 cm, inner radius 1.8 m, carrier support lathe 2, carrier filling layer 2, the height of each carrier layer 0.5 cm) and was filled with about 5.0 m³ of fixing carriers. Various kinds of culture media containing mixed bacteria such as *Thiobacillus* sp., *Pseudomonas* sp., *Bacillus* sp. and the like were inoculated to the storage tank 10 of culture medium. As illustrated in FIG. 1 and FIG. 2, the stirring device of carriers had the size in 1.6 m of diameter, 0.5 m of height in the stirring bar, 0.2 m of interval and 2 devices was installed per one biofilter module. The stirring device was operated in 1 rpm of velocity for 10 minutes when the pressure loss on the carrier layer was more than 4.0 cm and then the circulating pump 32 was operated for 5 minutes at 100 L/min of speed and the circulating water was sprinkled for separating the biological membrane. In order to sustain the bacterial growth and the decomposition activity, the circulating water (culture medium) containing K, P, N, S, Mg and Fe was sprinkled onto the carrier layer 6 of each biofilter module 1 by using the circulating pump for about 3 hours and the seed bacteria were fixed onto the carrier so as to prepare the biofilter module. As a major source of polluted gas, malodors were obtained from the sewage transit pump plant. In order to provide essential nutrients for the bacterial growth, the injecting device for solid nutrients was utilized to provide one solid nutrient (15 cm of diameter×1.5 cm of width; major components: S, P, N, Mg, Fe, Ca and so on) every 10 day. The malodoring gas from the sewage transit pump plant was analyzed by the mass spectrometer (GC/MS) exploiting the gas chromatography. As a result, the major components were identified to be ammonia, hydrogen sulfide, aldehydes and VOC substances and the malodoring substance of the sewage transit pump plant was a complex gas mixture comprising 1~10 ppm of ammonia, 0.2~2.0 ppm of hydrogen sulfide, less than 0.1 ppm of aldehydes and other kinds of VOC. The major VOC malodoring substances were methane, hexane, cyclopentane, benzene, styrene, xylene and the like. Then, the retention period of polluted gas in the biofilter module was changed in between 2~4 seconds to elucidate the efficiency of the deodorification and this operation was performed at room temperature. The deodorification ratio in each apparatus was calculated to measure the malodor concentration ($OU \cdot m^{-3}$) which was obtained by exploiting the air dilution method as the authorized experimental method for the air pollution. The method was proceeded that the malodoring gas was diluted with clean air and the proportion of the dilution was measured until the malodor disappeared. Precisely, the malodor concentration ($OU \cdot m^{-3}$) was a maximum dilution number for detecting smell and can be recognized when the malodoring gas diluted with fresh air reached the state without malodor. In the biofilter apparatus, the ratio for removing malodoring gas and the concentration variation depending upon changes of the operation period was depicted in FIG. 5. As illustrated in FIG. 5, if bacteria without malodor were inoculated to the biofilter, the deodorification ratio was low to about 10% in the initial operation stage of the filter system, but after 1 day from the operation the ratio increased radically, after about 5 days, the ratio reached more than 90%. About 10 days after the stabilization that the deodorified bacteria was fixed onto the fixing carriers, the ratio that the biofilter removed malodors became very high so as to reach about 98~99%. In the initial stage of the operation, the concentration of malodors discharged from the generator was sustained in the range of 3,000~5,000 $OU \cdot m^{-3}$ and after 30 days, it was maintained consistently in the range of 5,000~6,000 $OU \cdot m^{-3}$. In case that this malodoring gas concentrated highly was treated onto the biofilter, the concentration of malodors in the exhaust port was below 100 $OU \cdot m^{-3}$ and that in the biofilter exhaust port which was measured by the organoleptic method was below about 1 degree and sustained lowly. This result showed very excellent capacity for the deodorification. Although the malodors was inlet to reach about 2,500 OU/min, most capacities for removing malodors were maintained to more than 98%, which showed very good capacity for the deodorification. The critical capacity for removing malodors became about 2,500 OU/min. During 150 days of the operation, the pressure loss increased twice to more than 40 mm $H_2O$/m and when the stirring device and the process for spraying water was utilized to separate the microorganismic membrane, the pressure loss can be maintained to less than 40 mm $H_2O$. Therefore, this apparatus of the present invention was confirmed to provide a stable efficiency to remove malodors.

PREFERRED EMBODIMENT 3

Figure 6:
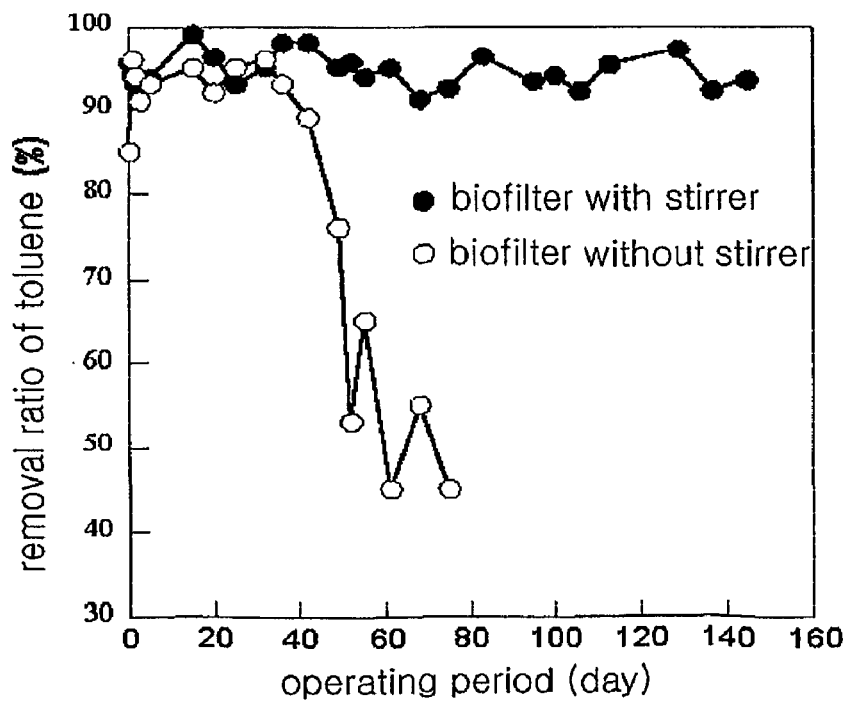
FIG. 6 depicts the capacity for decomposing toluene by using the biofilter apparatus installed with the stirring device.

The Capacity for Decomposing VOC Substances by Using the Biofilter Apparatus Installed with the Stirring Device As one of major VOC substances, toluene was diluted with air in the gas mixer, evaporated and injected into the biofilter module 1 described in Preferred Embodiment 2. Then, two cases such that the stirring device of the biofilter apparatus was operated and was not operated were estimated for the decomposition capacities of organic compounds. The polluted gas injected went through the fixing carrier layer 6 in which the decomposing microorganism was fixed in the biofilter module 1 and then toluene was removed. As an example, the carrier layer filled onto the biofilter module 1 was adjusted to have 4 seconds of the retention time in the polluted gas by the injection amount of polluted gas. The circulating water was sprayed periodically onto the carrier layer with the interval of 6~8 hours and the humidity needed for the bacterial growth was provided. As elucidated above, toluene among the polluted gas was removed and the concentration of toluene within gas was determined in the course of removal as followed. The inject port and exhaust port of the biofilter module was used to collect air and then the gas chromatography (HP5890 plus II, Hewlett Packard, U.S.A.) installed with the analysis column HP-1 and the frame ionization detector (FID) was performed to analyze the components of gas. When the stirring device was operated, the concentration of toluene and the removal ratio which varied according to the retention periods of polluted gas and the removal ratio which varied according to the toluene concentrations were shown in FIG. 6. As depicted in FIG. 6, as an air purifier, the biofilter apparatus of the present invention for polluted gas containing malodors and VOC was exploited to adjust the retention time to about 4 seconds and during about 150 days, the ratio for removing toluene was calculated to reach 90~95%. On the contrary, if the stirring device did not work, the removal ratio was in the range of 90~95% for about 40 days, but after 40 days, the removal ratio was identified to be reduced radically. Consequently, the biofilter apparatus for removing malodors and volatile organic chemicals installed with the stirring device of the present invention was verified to confer the high stability for the operation and the remarkable removal ratio.

PREFERRED EMBODIMENT 4

Figure 7:
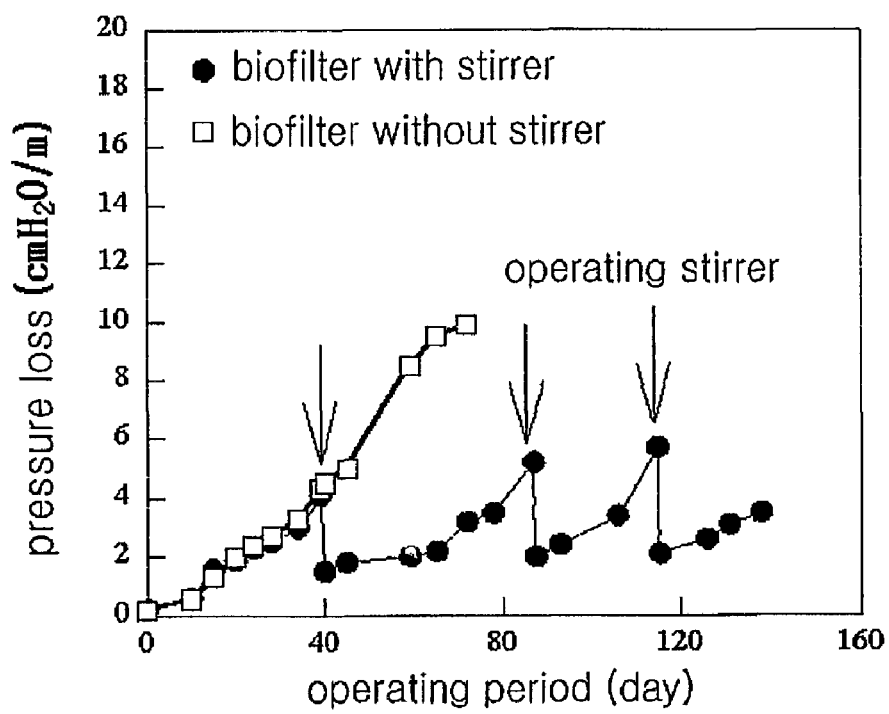
FIG. 7 depicts the variation of pressure losses in the biofilter module according to the operation period in the present invention.
Figure 8:
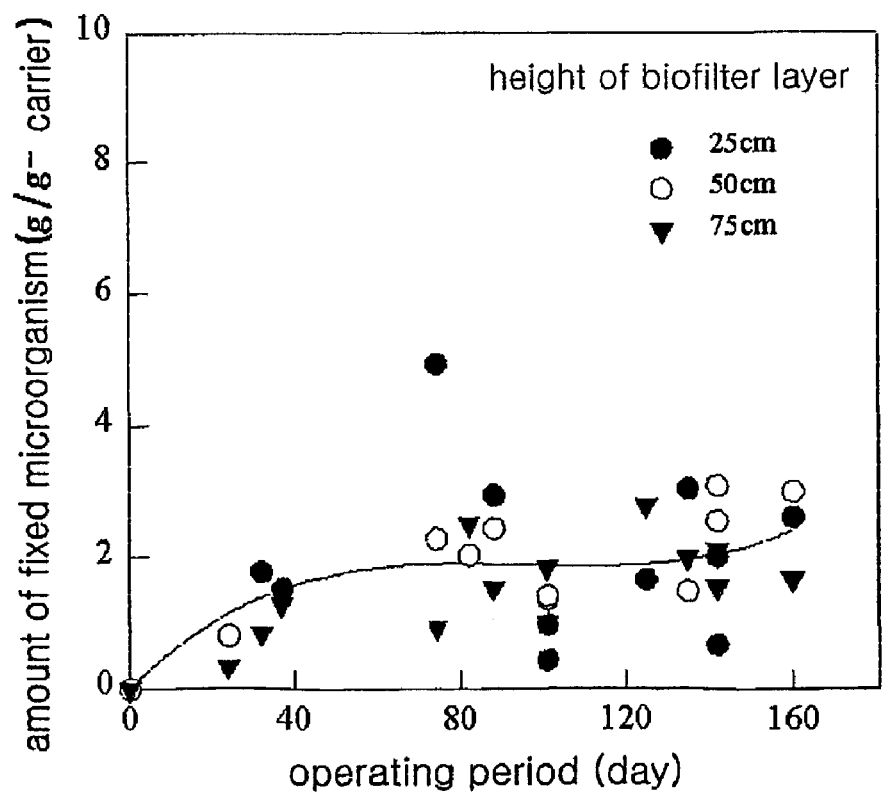
FIG. 8 depicts the variation of the fixed amounts for microorganisms in the biofilter module according to the operation period in the present invention.

The Amount of Fixed Microorganism and the Changes of Pressure Losses in Accordance with the Prolonged Operation By exploiting the apparatus and the process described in Preferred Embodiment 3, the pressure loss of the fixing carrier layer filled onto the biofilter module in the course of the purification of toluene containing gas was measured to install U-type manometer filled with water onto the inject port and the exhaust port. Besides, the cell concentration which was fixed onto the carrier was estimated by processing the same procedure. Concretely, in order to calculate the cell concentration on the fixing carrier, the fixing carrier was obtained from the biofilter module, dried in the oven at 100° C. for 24 hours and then the cell weight was calculate with the electric balance. The dried carrier was added to 0.1 N NaOH solution, heated in the boiling water at 100° C. for 30 minutes so as to eliminate cells, dried again and then measured for the weight so as to be estimated. In case that the stirring device was not operated, the pressure loss was identified to increase to more than 4.5 cm $H_2O$/m radically after about 40 days (See FIG. 7). On the contrary, the apparatus designed in the present invention was confirmed to maintain the pressure loss per 1 m height of the carrier layer below 4.5 cm $H_2O$ during about 150 days of the operation by controlling the stirring device and the cleaning (See FIG. 7). In addition, the amount of microorganism fixed onto the carrier was verified to have a constant value within 0.5~3.0 g of dried cell weight per unit g of carriers (See FIG. 8).

Consequently, the biofilter apparatus which was installed with the stirring device in the present invention was confirmed to have the degradable capacity for malodors and VOC material as well as to prevent the block phenomenon resulted from the excessive proliferation of microorganisms by stirring the carrier layer and spraying. Therefore, the biofilter apparatus of the present invention can perform the removal processes stably.

INDUSTRIAL APPLICABILITY

As demonstrated clearly and confirmed above, the biofilter apparatus of the present invention includes the carrier layer for fixing microorganism which is composed of foamy polymer material fixing microorganism and sustaining humidity highly or of polymer material with a net structure so that it can improve the efficiency for decomposing malodors and VOC included in polluted gas. The stirring device of the fixing carriers prevents the block resulted from the bacterial growth and eliminates the biological membrane. Therefore, even in the prolonged operation the bacterial amount per the fixing carrier can be maintained consistently, which solves the problems that the pressure loss increases and the removal ratio for malodors and VOC reduces in accordance with the excessive growth of microorganisms. The process for preparing solid nutrients and the injecting device for solid nutrients facilitates the operation and the management. Hence, the present invention can be applied widely to treat polluted gas including malodors and volatile organic chemicals and generated from various industrial facilities and environmental foundations.

What is claimed is:

1. A module for a biological decomposition apparatus for malodors and volatile organic chemicals comprising:

a housing in which an inject port of polluted gas and an exhaust port of treated gas are installed, a plurality of consecutive carrier layers with carriers for microorganisms loaded on support lathes in said housing, a plurality of spray tubes, each installed between an upper surface of a carrier layer of said plurality of carrier layers and an inner upper surface of a portion of said housing and injecting circulating water with nutrients therein onto an upside of a first one of the plurality of carrier layers, a stirring device for detaching microorganisms overformed onto the carriers of the plurality of carrier layers by shaking said plurality of carrier layers; and, the microorganisms on the carriers are detached by said stirring device, and removed with said circulating water sprayed by said plurality of spray tubes in order to regulate a mass of the microorganisms in the plurality of carrier layers, wherein, in said plurality of carrier layers for microorganisms, each of the plurality of carrier layers has a net structure or a foamy structure prepared with one of, or a mixture of, more than two substances selected from a group comprising polystyrene, polyethylene, polypropylene and polyurethane, and further comprising a pH controller regulating a pH of said circulating water and an injecting device to inject the nutrients into the circulating water, wherein the circulating water is passed through a screen to remove biological membrane separated from a surface of the carriers and is recirculated to be sprayed by the plurality of spray tubes.

2. A biological decomposition apparatus for malodors and volatile organic chemicals comprises:

said module of claim 1; and, a storage tank of the circulating water and the nutrients to provide a nutrient medium to the carriers in said module, in which the polluted gas is injected through said inject port and passes through the plurality of said carrier layers of microorganisms, and the treated gas is discharged through said exhaust port.

3. The module for the biological decomposition apparatus for malodors and volatile organic chemicals according to claim 1, in which said stirring device is in a cylinder shape.

4. The module for the biological decomposition apparatus for malodors and volatile organic chemicals according to claim 1, in which a stirring bar of said stirring device is non-symmetrical, with respect to a stirring axis center, in right and left directions.

* * * * *